(12) United States Patent
Kochem et al.

(10) Patent No.: US 8,968,632 B2
(45) Date of Patent: Mar. 3, 2015

(54) LABEL FILM FOR BLOW-MOULDING METHOD

(75) Inventors: Karl-Heinz Kochem, Neunkirchen (DE); Bertram Schmitz, Sarreguemines (FR); Mathias Roth, Zweibrücken (DE); Wilfrid Tews, Bechhofen (DE)

(73) Assignee: Treofan Germany GmbH & Co. KG (DE)

( * ) Notice: Subject to any disclaimer, the term of this patent is extended or adjusted under 35 U.S.C. 154(b) by 0 days.

(21) Appl. No.: 13/586,470

(22) Filed: Aug. 15, 2012

(65) Prior Publication Data

US 2013/0037983 A1     Feb. 14, 2013

Related U.S. Application Data

(62) Division of application No. 11/909,029, filed as application No. PCT/EP2006/002417 on Mar. 16, 2006, now abandoned.

(30) Foreign Application Priority Data

Mar. 19, 2005  (DE) .................. 10 2005 012 871

(51) Int. Cl.
| | |
|---|---|
| B29C 49/24 | (2006.01) |
| C08K 5/098 | (2006.01) |
| B32B 27/06 | (2006.01) |
| B32B 27/18 | (2006.01) |
| B32B 27/32 | (2006.01) |
| C08K 5/00 | (2006.01) |
| C08K 5/20 | (2006.01) |
| C08L 23/10 | (2006.01) |
| C08L 53/00 | (2006.01) |
| C08L 23/16 | (2006.01) |

(52) U.S. Cl.
CPC ............... *C08K 5/098* (2013.01); *B32B 27/06* (2013.01); *B32B 27/18* (2013.01); *B32B 27/32* (2013.01); *C08K 5/0083* (2013.01); *C08K 5/20* (2013.01); *C08L 23/10* (2013.01); *C08L 53/00* (2013.01); *B32B 2307/518* (2013.01); *B32B 2307/704* (2013.01); *B32B 2519/00* (2013.01); *C08L 23/16* (2013.01); *C08L 2205/242* (2013.01)
USPC ................... 264/509; 264/540; 264/45.1

(58) Field of Classification Search
None
See application file for complete search history.

(56) References Cited

U.S. PATENT DOCUMENTS

| | | | | |
|---|---|---|---|---|
| 4,883,697 A | * | 11/1989 | Dornbusch et al. | 428/35.7 |
| 4,986,866 A | | 1/1991 | Ohba et al. | |
| 5,254,302 A | | 10/1993 | Yamanaka | |
| 5,405,667 A | * | 4/1995 | Heider | 428/36.5 |
| 6,013,353 A | | 1/2000 | Touhsaent | |
| 6,228,316 B1 | | 5/2001 | Moseley, III | |
| 6,444,301 B1 | * | 9/2002 | Davidson et al. | 428/315.5 |
| 6,838,042 B1 | | 1/2005 | Wieners et al. | |

(Continued)

FOREIGN PATENT DOCUMENTS

| | | |
|---|---|---|
| CA | 2580406 A1 | 4/2006 |
| DE | 3610644 A1 | 10/1986 |

(Continued)

*Primary Examiner* — Monica Huson
(74) *Attorney, Agent, or Firm* — Drinker Biddle & Reath LLP

(57) ABSTRACT

The invention relates to a biaxial oriented film with a microporous layer, comprising a propylene polymer and at least one β-nucleating agent the microporosity of which is generated by conversion of β-crystalline polypropylene on drawing the film and the use thereof for the labelling of containers in blow molding. The Gurley value for the film is 10,000 to 300,000 Gurley.

12 Claims, 3 Drawing Sheets

(56) References Cited

U.S. PATENT DOCUMENTS

2004/0096744 A1* 5/2004 Sadamitsu et al. ............ 429/254
2005/0212183 A1 9/2005 Busch et al.

FOREIGN PATENT DOCUMENTS

| | | |
|---|---|---|
| DE | 4420989 A1 | 12/1995 |
| DE | 4420991 A1 | 12/1995 |
| DE | 19949898 A1 | 3/2000 |
| EP | 0546741 A1 | 6/1993 |
| EP | 0557721 A2 | 9/1993 |
| EP | 0559484 A1 | 9/1993 |
| EP | 0865909 A1 | 9/1998 |
| WO | WO-00/12288 A1 | 1/2000 |
| WO | WO-03/091316 A1 | 11/2003 |
| WO | WO-2006/040057 A1 | 4/2006 |

* cited by examiner

LABEL FILM FOR BLOW-MOULDING METHOD

RELATED APPLICATIONS

This application is a divisional application of U.S. patent application Ser. No. 11/909,029, filed Sep. 19, 2007, which is a national stage application (under 35 U.S.C. §371) of PCT/EP2006/002417, filed Mar. 16, 2006, which claims benefit of German Application No. 10 2005 012 871.8, filed Mar. 19, 2005.

The invention at hand concerns a biaxially-oriented film with microporous layer which contains propylene polymers and at least one β-nucleating agent and whose microporosity is developed by conversion of β crystalline polypropylene on stretching the film and whose use is as an in-mould label during blow-moulding.

Label films cover an extensive and technically complex domain. A distinction is drawn between different labelling techniques which differ fundamentally regarding the process conditions and necessarily place differing technical demands on the labelling materials. All labelling processes are alike in that the end result must be optically attractive labelled boxes, on which a good adhesion to the label must be ensured.

Very different techniques for applying the label are used in the labelling method. A distinction is drawn between pressure-sensitive labels, wrap-around labels, shrink labels, in-mould labels, patch labelling etc. The use of a thermoplastic synthetic film as a label is possible in all of these different labelling methods.

A distinction is also drawn within in-mould labelling between different techniques, for which different procedural constraints apply. All in-mould labelling methods are the same in that the label takes part in the actual box shaping method and is applied during this. However, here very different shaping methods come to be used, like die-casting methods, blow-moulding methods, deep-drawing methods.

In die-casting methods, a label is laid in the die mould and injected with a melted fluid plastic. Through the high temperatures and pressures the label bonds itself to the die-casting component and becomes an integral, non-detachable component of the injection-moulded piece. According to this method beakers and lids for ice cream or margarine tubs are manufactured.

In this, individual labels are removed from a pile or cut from a roll and laid in the die mould. The mould is thereby shaped in such a way that the melted stream is injected behind the label and the front side of the film lies on the wall of the die mould. On injection the hot melts bond to the label. After injection the tool opens, the injection-moulded piece is ejected and cools off. As a result the label must stick without creases to the container and be optically spotless.

On injection the injection pressure lies in the region of 300 to 600 bar. The plastics used have a melt flow index of around 40 g/10 min. The injection temperatures depend upon the plastics used. In some cases the mould is additionally cooled in order to avoid adhesion of the injection-moulded piece with the mould.

In deep-drawing, non-oriented thick plastic plates, mostly poured PP or PS, are heated in a thickness of around 200 μm and pulled or pressed by means of a vacuum or die tool into a corresponding moulding tool. Here too the individual label is laid in the mould and bonds to the actual container during the moulding process. Considerably low temperatures come to be used, so that the adhesion of the label to the container can be a critical factor. The good adhesion must also be guaranteed at these low processing temperatures. The processing speeds of this method are lower than in die-casting.

A direct in-mould labelling is also possible in the blow moulding of containers. In this method a fusion tube is extruded vertically downwards through a concentric nozzle. A vertically-split moulding tool travels together and surrounds the tube, which is thereby squeezed on the lower end. On the upper end a core-pin for blowing is introduced through which the opening of the moulded article is constructed. Over the core-pin air is conveyed to the warm fusion tube, so that it expands and reaches the inner wall of the moulding tool. In this the label must bond with the semifluid plastic of the fusion tube. Subsequently the mould is opened and the overreach on the moulded opening cut off. The moulded and labelled container is ejected and cooled off.

In this blow-moulding method the pressure on inflation of the fusion tube comes to about 4-15 bar and the temperatures are fundamentally lower than in die-casting. The plastic materials have a lower MFI than in die-casting in order to build a dimensionally stable fusion tube, and therefore behave differently in the cooling process to the low-viscosity materials for die-casting.

Also, in this blow-moulding method an increased number of biaxially-oriented thermoplastic synthetic films are put to use in labelling the boxes. In this the films must feature a selected properties profile in order to guarantee that the label film and the blow mould nestle and bond to each other flush and free of blowholes. For this purpose different solutions were suggested in the prior art.

It is known in the prior art, for example, that air pockets, which as large bubbles impair the optical characteristics and adhesion, can be prevented by a special film surface roughness.

For this, the side of the film facing the container must feature a roughness in the region of μm, which makes possible a displacement of the air in labelling. Theses kinds of roughness are produced, for example, by a special composition of the top layer of multi-layered films or by structuring the surface.

So, in the U.S. Pat. No. 5,254,302 a BOPP film is described, the back side of which is modified by imprinting into a definite surface structure. After imprinting the film is layered on this side with a hot-melt adhesion system in such a way that the surface structure remains conserved. The adhesion system guarantees the adhesion of the label film on the mould and the structured surface inhibits the formation of bubbles.

U.S. Pat. No. 4,986,866 describes a multi-layered papery label film with an impermeable top layer, which must be stamped mechanically by means of rollers before the stretching process. Here also this surface structure should make possible the removal of air from and bubble-free adhesion of the label.

DE 199 49 898 describes the use of a polypropylene film with a median roughness of at least 3.5 μm for the labelling in the blow-moulding method. This roughness is produced by a polypropylene mixture in the top layer, whereby this mixture consists of polypropylene and incompatible or partially-compatible thermoplastic polymers.

Next to these bubbles, a further, independent, undesired effect emerges in the blow-mould labelling: the formation of a so-called orange peel. This effect has nothing to do with the large bubbles which arise through insufficient air removal. Orange peel does no appear in the form of isolated bubbles of a greater or smaller size, but rather the entire label surface is uneven with a certain regularity, so that the appearance of the surface structure very strongly resembles an orange, due to which it is often called orange peel. Sometimes this disruption is also called leather skin or "leathery effect". Various solutions were suggested for the minimisation of the orange peel effect. One line of development is based on the supposition that the orange peel arises through contraction of the blow-moulded container during cooling. On the other hand, the injection-moulded pieces of the in-mould die-casting also shrink very strongly on cooling, and yet this method is much less susceptible to disruptive orange peel effects.

EP 0 559 484 describes a film for the in-mould labelling, whereby there is no differentiation between in-mould die-casting and in-mould blow-forming. The film features a top layer of polyethylene and filler materials, which is applied to a base layer containing vacuoles. The polyethylene layer faces the container and further layers can be applied to the opposite outer side. According to this teaching, the emergence of a leather skin effect can be concealed by further pigmented outer layers.

EP 0 546 741 describes a film with a top layer containing vacuoles, which is applied to a base layer not containing vacuoles. The top layer containing vacuoles faces the container in the in-mould process. According to this teaching the orange peel arises through contraction of the label film containing vacuoles in injection moulding and can be avoided in as much as one avoids too much vacuole formation and reduces the filler content of the film.

In contrast, WO00/12288 teaches that, through a controlled contraction of the label, less orange peel emerges, and recommends improving the orange peel effect in blow-moulding through specific contraction properties of the film. Accordingly, the in-mould label film should feature a shrinkage of at least 4% in both directions at 130° C. over 10 min. Through this shrinkage, less orange peel emerges in blow-mould labelling. This teaching confirms at the same time, however, that too small a density in turn leads to increased orange peel build-up. It is therefore additionally recommended to keep the density of the film in the region of 0.65 to 0.85 g/cm$^3$.

In practice, it seems that all blow-moulding methods are essentially more susceptible to orange peel effects in labelling than the methods of in-mould labelling in die-casting.

All known teachings solve the problem of the build-up of orange peel in the use of biaxially-oriented film in in-mould blow-moulding unsatisfactorily, or feature other serious disadvantages. The suggested measures indeed show partially reliable results when used in die-casting, but in blow-moulding the appearance of the label on the container is as defective as before and strongly affected by orange peel.

EP 0 865 909 describes the use of "microvoided" film for labels. The film contains a β-nucleating agent, through which on cooling the melt film a heightened proportion of β crystalline polypropylene is produced in the prefilm. On stretching the prefilm "microvoids" are produced. It is described that the film features a good printability.

The EP 1 501 886 describes the use of a biaxially-oriented microporous film of polypropylene, which contains β-nucleating agent. The microporosity is produced by transforming β-crystalline polypropylene on stretching the film. The film can be adopted advantageously in the labelling of boxes in blow-moulding due to it high porosity. The methods for manufacturing the film are, in practice, very slow, in order to ensure the desired high porosity. Additionally, high porosities weaken the film mechanically in such way that tears often come about in the stretching frame. Through this the film becomes more expensive and makes economic use difficult despite technical advantages.

The task of the invention at hand consists in making available a label film which should feature good adhesion and no orange peel in in-mould labelling in blow-moulding methods, and which can be manufactured with sufficient production speed and production reliability.

The task underlying the invention is solved by a biaxially-oriented film with a porous layer containing polypropylene and β-nucleating agent, the microporosity of which can be produced by transforming β-crystalline polypropylene on stretching the film, and the Gurley value of which ≥10000 s. The microporous layer is a layer of the film lying on the outside. The task is solved furthermore by the use of this film for labelling boxes in blow-moulding.

It was found that a film with a microporous layer, the Gurley value of which lies over 10000 s, can be used surprisingly excellently in blow-mould labelling and that no kind of orange peel emerges in the most varied methodological conditions, provided this microporosity is produced indirectly by a β-nucleating agent. According to the teaching of EP 1 501 886, a high film porosity is necessary in order to ensure a good removal of air over the high gas permeability of the porous layer which is found in contact with the box. Within the scope of the invention at hand it was surprisingly found that the high porosities are indeed beneficial, but not necessary. The net-like structure of the porous layer as such also contributes to air removal at comparably small levels of gas permeability (high Gurley values) in the same way, and prevents bubble build-up in labelling surprisingly effectively, if this layer faces the box when labelling. For this reason it is possible to raise the production speeds substantially. The film is overall mechanically basically stable, through which the quantity of tears in manufacture is reduced. The invention therefore features considerable economic advantages and the film according to the invention can be put to use in blow-mould labelling without bubble build-up.

BRIEF DESCRIPTION OF THE DRAWINGS

The microporous structure of the porous layer differs significantly from that of the conventional films containing vacuoles. FIGS. 2a and 2b show the typical structure of a layer containing vacuoles in cross-section (2a) and in plan view (2b). Through the incompatibility of the vacuole-instigating particles, tears in stretching come about between the surface of the particle and the polymer matrix, and a closed, air-filled hollow space emerges, in which the incompatible particle resides. These hollow spaces are called vacuoles or "voids". The vacuoles are spread out over the whole layer and reduce the density of the films, or rather of the layer. These films nevertheless still have a good barrier, for example against water vapour, as the vacuoles are closed and the structure is overall not permeable. Opaque films with a layer containing vacuoles give rise the unwanted orange peel in blow-moulding.

In contrast to this, the porous layer is permeable to gas and features an open-pored network structure. This structure comes about not through incompatible fillers or particles, but according to a technically very different method. The microporous layer contains polypropylene and β-nucleating agent. This mixture of polypropylene with β-nucleating agent is initially melted on in an extruder—as is conventional in film manufacture—and extruded through a flat die as melt film on a cooling roller. The β-nucleating agent develops the crystallisation of β-crystalline polypropylene while cooling the melt film, so that an unstretched prefilm with a high β-crystalline polypropylene content emerges. On stretching this prefilm, the temperature and stretch conditions can be chosen so that the β-crystallites transform into the thermally-stable alpha phase of the polypropylene. As the density of the β crystallites is lower, this conversion accompanies a shrinkage of volume and through this leads to the characteristic porous structure, similar to a torn-open network.

Figure 1A:
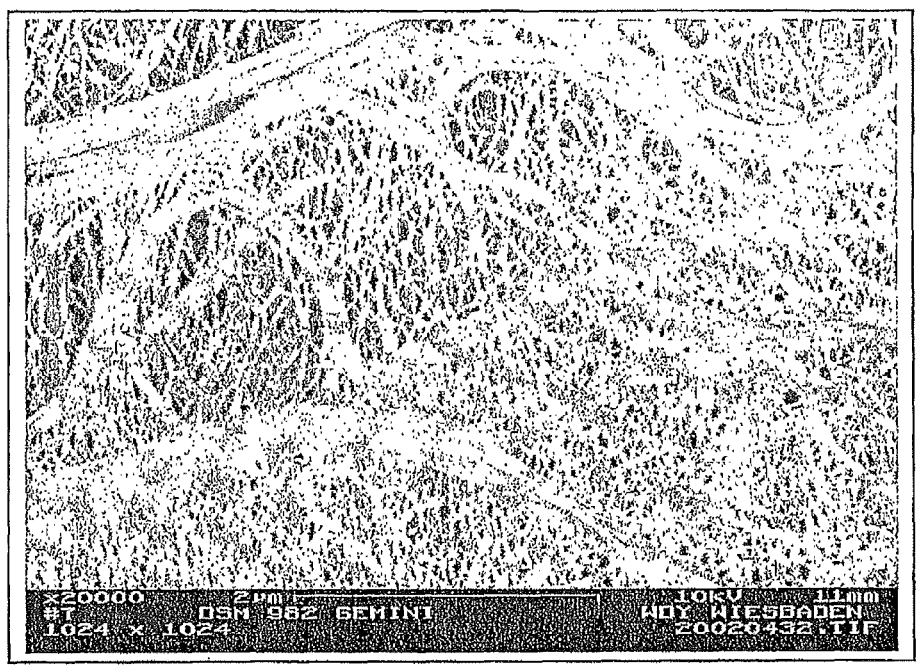
FIGS. 1a and 1b show highly porous films as per EP 1 501 886 have, as is visible from FIGS. 1a (plan view) and 1b (cross section), an open pored network structure of such a kind that open pores are distributed equally over the whole surface.
Figure 1B:
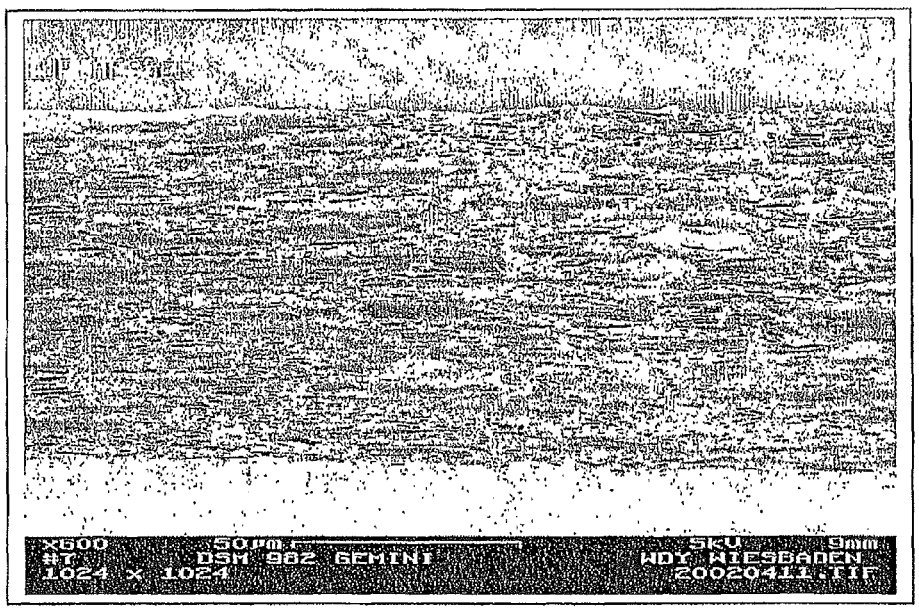
Figure 2A:
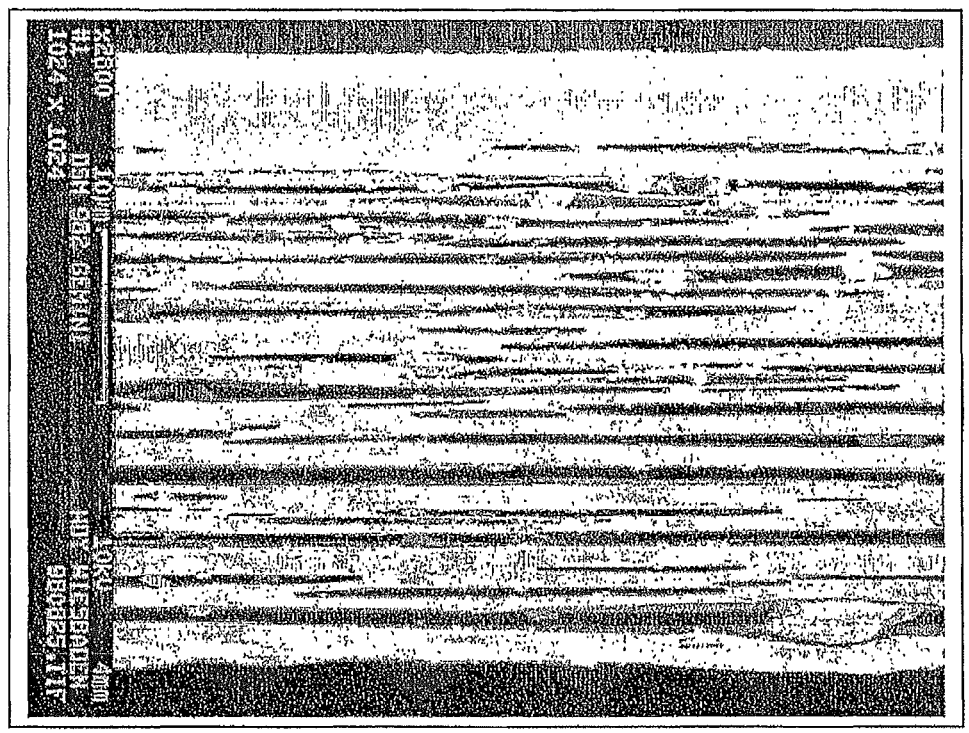
FIGS. 2a and 2b show the typical structure of a layer containing vacuoles in cross-section (2a) and in plan view (2b).
Figure 2B:
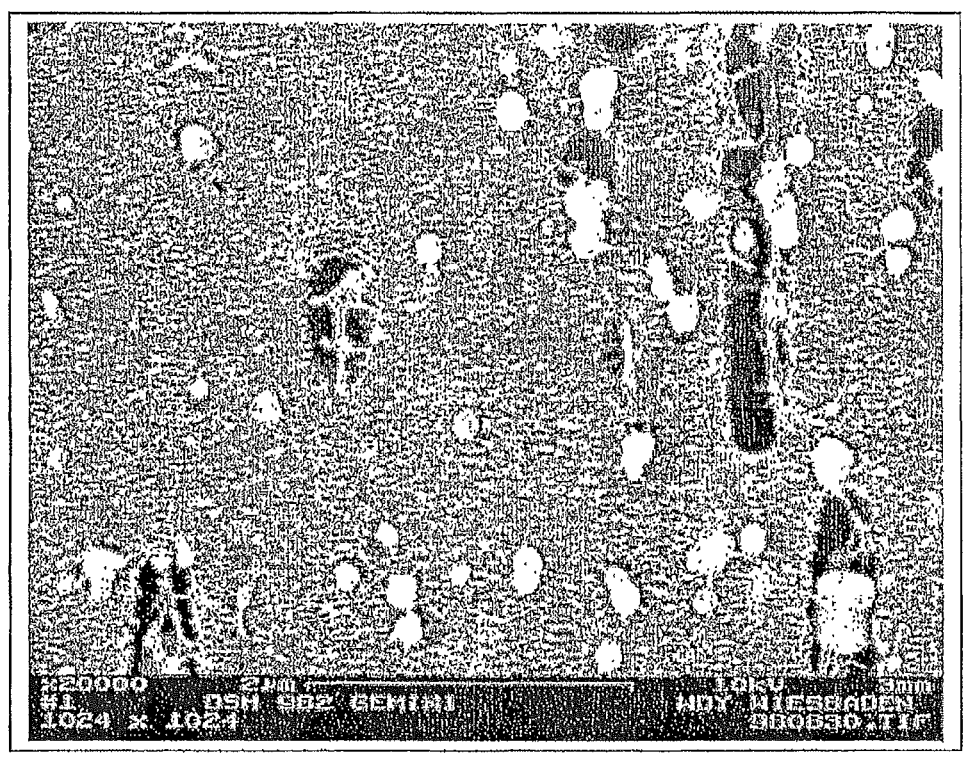
Figure 3A:
FIGS. 3a and 3b show a porous layer having a net-like structure with pores bound to each other.
Figure 3B:
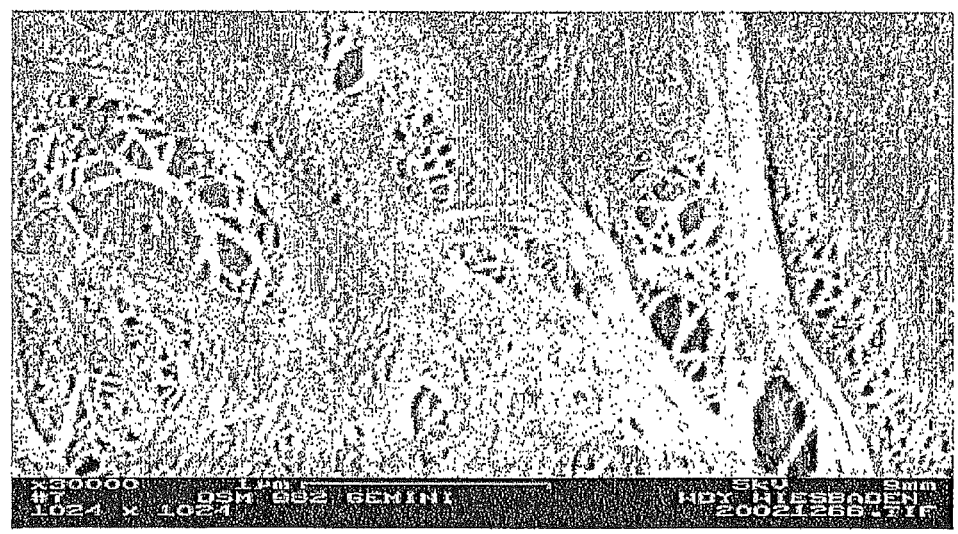

Surprisingly, it was found that a film with porous layer can be equally well put to use in blow-moulding method as label film, even if the porosity is substantially lower and the structure features fewer open-pored areas. Highly porous films as per EP 1 501 886 have, as is visible from FIGS. 1a (plan view) and 1b (cross section), an open-pored network structure of such a kind that open pores are distributed equally over the whole surface. The films according to the invention as per FIGS. 3a and 3b have a similarly fibril-like structure, but there are substantially fewer pores on the surface, so that the surface also features areas which are virtually closed. Surprisingly, it is sufficient that the pores only exist in portions of the surface, in order to avoid bubble build-up in blow-mould labelling.

The composition of the microporous layer, hereafter also called layer, will henceforth be described more closely, individually. The microporous layer contains propylene homopolymer and/or a propylene block copolymer, if necessary additional conventional additives, for example stabilisers, neutralising agents, lubricants, static inhibitors, pigments in quantities efficient at any one time. In general, additional incompatible vacuole-instigating filler materials like calcium carbonate or polyesters like PET or PBT are avoided, so that the layer contains less than 5% by weight, preferably 0 to at most 1% by weight of these vacuole-instigating filler materials. Small quantities of this kind can get into the layer in the incorporation of regenerated film, for example.

In general, the layer contains at least 70% by weight, preferably 80 to 99.95% by weight, especially 90 to 97% by weight of a propylene homopolymer and/or propylene block copolymer and 0.001 to 5% by weight, preferably 0.1 to 3% by weight at least of a β-nucleating agent, in each case relative to the weight of the layer.

Suitable propylene homopolymers contain 80 to 100% by weight, preferably 90 to 100% by weight of propylene units and have a melting point of 140° C. or higher, preferably 150 to 170° C., and in general a melt flow index of 0.5 to 10 g/10 min, preferably 2 to 8 g/10 min, at 230° C. and a strength of 2.16 kg (DIN 53735). Isotactic propylene homopolymers with an atactic content of 15% by weight and less represent preferred propylene polymers for the layer, whereby isotactic propylene homopolymer is especially preferred.

Suitable propylene block copolymers contain predominantly, i.e. more than 50% by weight, preferably 70 to 99% by weight, especially 90 to 99% by weight, propylene units. Suitable comonomers in appropriate volumes are ethylene, butylene or higher alkene homologues, among which ethylene is preferred. The melt flow index of the block copolymers lies in a region of 1 to 15 g/10 min, preferably 2 to 10 g/10 min (230° C.; 2.16 kg). The melting point lies above 140° C., preferably in the region of 150 to 165° C.

The weight percentages given relate to the respective polymers.

Mixtures of propylene homopolymers and propylene block copolymers contain both these components in optional ratios. Preferably, the relationship of propylene homopolymer to propylene block copolymer lies in a region of 10 to 90% by weight to 90 to 10% by weight, preferably 20 to 70% by weight to 70 to 20% by weight. These kinds of mixtures of homopolymers and block copolymers are especially preferred and improve the optics of the microporous layer, as well as the ductility.

Where applicable, the porous layer can contain other polyolefins additional to the propylene homopolymers and/or propylene block copolymers. The share of these other polyolefins lies in general under 30% by weight, preferably in a region of 1 to 20% by weight. Other polyolefins are, for example, statistical copolymers of ethylene and propylene with an ethylene content of 20% by weight or less, statistical copolymers of propylene with $C_4$-$C_8$-olefins with an olefin content of 20% by weight or less, terpolymers of propylene, ethylene and butylene with an ethylene content of 10% by weight or less and with a butylene content of 15% or less, or polyethylenes like HDPE, LDPE, VLDPE, MDPE and LLDPE.

As β-nucleating agents for the microporous layer, basically all known additives which promote the creation of β crystals in the cooling of a polypropylene melt are suitable. These kinds of β-nucleating agents, as well as their mode of action in a polypropylene matrix, are known in the prior art and are hereafter described individually.

Various crystalline phases of polypropylenes are known. On cooling a melt, typically what predominantly forms is the α-crystalline PP, which has a melting point lying at around 158-162° C. Through a specified temperature control a small portion of β-crystalline phase can be generated in cooling, which at 148-150° C. features a decidedly lower melting point relative to the monoclinic α modification. Additives are known in the prior art which lead to a raised portion of the β-modification in crystallising out the polypropylene, for example γ quinacridones, dihydroquinacridones or calcium salts of phthalic acid.

For the purposes of the invention at hand, highly-active β-nucleating agent is introduced in the porous layer which can produce a β-portion of 10-80%, preferably from 20-60%, on cooling the melt film. For this purpose a dual-component nucleating system of calcium carbonate and organic dicarboxylic acid is suited, for example, which is described in the DE 3610644, to which explicit reference is made here. Especially advantageous are calcium salts of dicarboxylic acids, like calcium pimelate or calcium suberate such as is described in DE 4420989, to which explicit reference is made. The dicarboxamides described in EP-0557721, especially N,N-dicyclohexyl-2,6-naphthalene-dicarboxamides are also suitable β-nucleating agents.

In addition to the nucleating agents, the adherence to a specific temperature range and retention times at these temperatures in the cooling of the melt film is important for the attainment of a high proportion of β-crystalline polypropylene. The cooling of the melt film takes place advantageously at a temperature of 60 to 130° C., especially 80 to 120° C. According to the invention, the very slow cooling, which promotes the growth of β crystallites, can take place quicker relative to EP 1 501 886. The haul-off speed, i.e. the speed at which the melt film runs over the first cooling roller, should be chosen so that the retention time at the given temperatures enables the growth of the β crystallites. In this connection it is now no longer necessary to achieve a maximal concentration of β crystals in the prefilm through maximal retention times on the outfeed roller. Rather, the production speed can be raised so far that the concentration of β crystals in the prefilm lies in the region of 20 to 60%, with which the film so manufactured features a Gurley value of 10000-300000 s after biaxial stretching. The haul-off speed can vary strongly depending on the dimensions of the outfeed roller and its temperature, and preferably comes to less than 35 m/min, especially 1 to 20 m/min.

Especially preferred embodiments contain 0.001 to 5% by weight, preferably 0.05 to 3.0% by weight, especially 0.1 to 1.0% by weight calcium pimelate or calcium suberate in the microporous layer of propylene homopolymer.

In general, the microporous label film is single-layered and consists only of the microporous layer. It nevertheless goes without saying that this single-layered film can be provided with an overprinting or a coating or an additional top layer if necessary, before it is applied as label film in blow-moulding. The thickness of the porous layer lies in general in a region of 20 to 150 μm, preferably 30 to 100 μm. The outer surface of the porous layer is not covered with further layers according to the invention, i.e. on this side of the film there takes place neither an overprinting nor a coating, lamination or any other kind of treatment which would lead to the pores of the porous layer becoming covered. Consequently, the surface of the porous layer forms a surface of the film.

If necessary, the microporous layer can be provided on the outer side with corona, flame or plasma treatment, in order to improve the adhesion properties and the wettability.

The density of the microporous layer lies in general in a region of 0.3 to 0.85 g/cm$^3$, preferably 0.4 to 0.7 g/cm$^3$, which corresponds to the density of the film in a single-layered embodiment. Surprisingly, it was found that an especially low density does not lead to a amplification of the orange peel effect like in opaque film containing vacuoles. In relation to opaque film containing vacuoles, relevant writings teach that too low a density leads to an increased orange peel effect through too intense voiding. Surprisingly, this is not the case for porous films. The density can be lowered to extremely low values and the film can still applied spotlessly in blow-moulding, without too disruptive an orange peel effect arising.

In a further embodiment, the microporous layer can be provided with a further top layer, whereby the microporous layer in the use of this multi-layered embodiment according to the invention is turned to the box and bonds with the mould in blow-moulding. Accordingly the additional top layer forms the outer side of the label in the use according to the invention. The additional top layer can, for example, be applied with a further film through lamination or layup of the porous layer. Preferably, this concerns a coextruded top layer. If necessary, coating is also possible.

Coatings can be applied according to conventional methods. Coatings are made, for example, of acrylic acids, acrylates, PVOH or other polymers which are adapted as impermeable or printable surface layers. These kinds of coatings are described in detail in U.S. Pat. No. 6,013,353 (column 6), for example, to the disclosure of which explicit reference is made here.

The coextruded (if applicable) top layer in general contains at least 70% by weight, preferably 75 to <100% by weight, especially 90 to 98% by weight of a polyolefin, preferably a propylene polymer and, where applicable, further conventional additives like neutralising agents, stabilisers, static inhibitors, lubricants e.g. fatty acid amides or siloxanes or lubricants in effective volumes in each case.

The propylene polymer of the top layer is e.g. a propylene homopolymer, as just described above for the porous layers, or a copolymer of propylene and ethylene, or propylene and butylene, or propylene and another olefin with 5 to 10 carbon atoms. For the aims of the invention, terpolymers of ethylene and propylene and butylene or ethylene and propylene and another olefin with 5 to 10 carbon atoms are suited for the top layer. Furthermore, mixtures or blends of two or more of the named co- and terpolymers can be adopted.

For the top layer, statistical ethylene-propylene copolymers and ethylene-propylene-butylene terpolymers are preferred, especially statistical ethylene-propylene copolymers with an ethylene content of 2 to 10% by weight, preferred 5 to 8% by weight, or statistical ethylene-propylene-butylene-1 terpolymers with an ethylene content of 1 to 10% by weight, preferred 2 to 6% by weight, and a butylene-1 content of 3 to 20% by weight, preferred 8 to 10% by weight, in each case relative to the weight of the co- of terpolymers.

The statistical co- and terpolymers just described generally feature a melt flow index of 1.5 to 30 g/10 min, preferably of 3 to 15 g/10 min. The melting point lies in the region of 105° C. to 140° C. The blend just described of co- and terpolymers has a melt flow index of 5 to 9 g/10 min and a melting point of 120 to 150° C. All melt flow indices just given are measured at 230° C. and at a load of 2.16 kg (DIN 53735).

The thickness of this top layer lies in general in a region of 0.1 to 10 μm, preferably 0.5 to 5 μm. If necessary, the surface of this top layer can be given corona, flame or plasma treatment for the improvement of the printability. The density of the film is raised only insubstantially by the non-porous top layer, which also contains no vacuoles, relative to single-layered embodiments, and hence in general for these embodiments lies in a region of 0.35 to 0.85 g/cm$^3$, preferably 0.4 to 0.65 g/cm$^3$.

If necessary, the top layer can additionally contain conventional additives like stabilisers, neutralising agents, anti-blocking agents, lubricants, static inhibitors etc. in quantities conventional in each case.

The porous film according to the invention is preferably manufactured according to the extrusion method or coextrusion method (flat film method) known in the art.

Within the scope of this method, one proceeds so that the polypropylene, which is mixed with β-nucleating agent, is melted on in an extruder and extruded through a flat die onto an outfeed roller, on which the melt hardens under build-up of β crystallites. In the case of dual-layered embodiment, the corresponding extrusion takes place together with the top layer. The cooling temperatures and cooling times are chosen so that a sufficient portion of β-crystalline polypropylene arises in the prefilm. This prefilm with β-crystalline polypropylene is subsequently stretched biaxially in such a way that in stretching a conversion of the β crystallites in alpha polypropylene comes about. The biaxially-stretched film is subsequently heat-set and corona-, plasma- or flame-treated on one or both sides as appropriate.

The biaxial stretching (orientation) is generally carried out consecutively, whereby, preferably, stretching takes place first of all longitudinally (in the machine direction) and then laterally (perpendicular to the machine direction).

The outfeed roller or rollers are kept at a temperature of 60 to 130° C., preferably 80 to 120° C., in order to promote the build-up of a high proportion of β-crystalline polypropylene.

In stretching in the longitudinal direction, temperature comes to less than 140° C., preferably 90 to 125° C. The stretching ratio lies in a region of 3:1 to 5:1. The stretching in the lateral direction takes place at a temperature of more than 140° C., preferably at 145 to 160° C. The lateral stretching ratio lies in a region of 3:1 to 7:1 stretched.

The longitudinal stretching will be carried out advantageously with the help of two different fast-running rollers corresponding to the targeted stretching ratio, and the lateral stretching with the help of a corresponding gripping frame.

In general, the heat setting (heat treatment) of the film follows its biaxial stretching, whereby the film is held roughly 0.5 to 10 s long at a temperature of 110 to 150° C. Subsequently the film is generally wound up with a winding apparatus.

Preferably, as mentioned above, one or both surfaces of the film are corona-, plasma- or flame-treated according to one of the known methods after the biaxial stretching. A surface treatment of this kind is especially preferred on the opposite surface of the porous layer (outer side of the label), if an overprinting and/or plating is provided within the scope of further treatment.

For the alternative corona treatment, the film is fed through between two conducting elements serving as electrodes, such that between the electrodes such a high voltage, mainly A.C. voltage (around 10000V and 10000 Hz), is applied that spray discharge or corona discharge can take place. Through the spray or corona discharge, the air over the film surface is ionised and reacts with the molecules of the film surface, so that polar repositions occur in the basically non-polar polymer matrix. The treatment intensities lie in the conventional range, whereby 38 to 45 mN/m are preferred.

According to this method a porous film with an opaque appearance is obtained. The porous layer has a net-like structure with pores bound to each other (see FIGS. 3a and 3b), which is permeable to gases. According to the invention, in a singled-layered embodiment these films feature a Gurley value in the region of 10000 to 300000 sec. In multi-layered embodiments with a top layer permeable to gases, the porous layer has a corresponding structure, so that comparable Gurley values exist for the layer.

According to the invention, the porous film is applied in a blow-moulding method. Details of the blow-moulding method have already been described previously in connection with the prior art. Preferably, the porous film is used for labelling polyethylene boxes in blow-moulding. According to the invention, the film is inserted in such a way that the porous layer faces the container. Suitable blow-moulding methods are also described e.g. in ISDN 3-446-15071-4, to which explicit reference is made here.

For the characterisation of the raw materials and the films, the following measuring methods were used:

Melt Flow Index

The melt flow index of the propylene polymers was measured according to DIN 53 735 at 2.16 kg load and 230° C., and at 190° C. and 2.16 kg for polyethylene.

Melting Points

DSC measurement, maximums of the melt curve, heating speed 20K/min.

Densities

The densities are determined according to DIN 53 479, method A.

β Crystal Content

For the determination of the proportion of β crystals (for example in the prefilm) in polypropylene, the DSC method was employed.

The characterisation by means of DSC is described in J. o. Appl. Polymer Science, Vol. 74, p.: 2357-2368, 1999 by Varga and carried out in the following way: the sample enriched with the β nucleator is, in the DSC, initially heated at a heating rate of 20° C./min to 220° C. and melted on (1st heating). Afterwards it is cooled at a cooling rate of 10° C./min to 100° C., before it is heated at a heating rate of 10° C./min (2nd heating) and melted again. On the second heating, the crystallinity level $K_{\beta,DSC}$ is determined out of the ratio of the melting enthalpy of the β-crystalline phase ($H_\beta$) to the sum of the melting enthalpies of β- and α-crystalline phases ($H_\beta + H_\alpha$).

Permeability (Gurley Value)

The permeability of the film was measured with the Gurley Tester 4110, according to tot ASTM D 726-58. At the same time, the time (in sec) will certainly require the 100 $cm^3$ of air in order to permeate through the 1 $inch^2$ (6.452 $cm^2$) label surface. The pressure difference across the film thereby corresponds to the pressure of a water column of 12.4 cm height. The required time then corresponds to the Gurley value.

The invention will henceforward be described through the following examples.

EXAMPLE 1

According to the extrusion method, a single-layered film was extruded out of a flat die at an extrusion temperature of 245° C. The film had the following composition:

Around 50% by weight Propylene homopolymerisate (PP) with an n-heptane-soluble portion of 4.5% by weight (relative to 100% PP) and a melting point of 165° C.; and a melt flow index of 3.2 g/10 min at 230° C. and 2.16 kg load (DIN 53 735) and Around 49.9% by weight Propylene-ethylene-block copolymerisate with an ethylene portion of around 5% by weight relative to the block copolymer and an MFI (230° C. and 2.16 kg) of 6 g/10 min.

0.1% by weight Ca-pimelate as β-nucleating agent

The film additionally contains stabiliser and neutralising agent in the conventional quantities.

After the extrusion, the melted polymer mixture is pulled off over a first outfeed roller and a further roller trio and hardened, subsequently stretched longitudinally, stretched laterally and secured, whereby in detail the following specifications are chosen:

Extrusion: Extrusion temperature 245° C.
Cooling roller: Temperature 125° C., retention time on the cooling roller 17 sec.
Longitudinal stretching: Stretch roll T=95° C.
Longitudinal stretching at Factor 4
Lateral stretching: Heating areas T=145° C.
Stretching areas T=140° C.
Lateral stretching at Factor 5.5

The porous film so manufactured was around 95 μm thick and featured a density of 0.50 g/$cm^3$ and showed a consistent white-opaque appearance. The Gurley value came to 95000 sec.

COMPARATIVE EXAMPLE 1

A film as described in example 1 was manufactured. In contrast to example 1, the retention time on the outfeed roller was raised to 55 sec. For this reason, the production speed in example 1 was more than three times as high as in this comparative example 1. The Gurley value of the film according to comparative example 1 came to around 1040 sec and the density 0.35 g/$cm^3$ at a film thickness of around 80 μm.

COMPARATIVE EXAMPLE 2

An opaque, three-layered film with an ABC layer composition and a total thickness of 80 μm was manufactured by coextrusion and by subsequent incremental orientation in the longitudinal and the lateral directions. The top layers each had a thickness of 0.6 μm.

Base Layer B (=Layer Containing Vacuoles)
93% by weight Propylene homopolymer with a melting point of 165° C.
7.0% by weight $CaCO_3$ of the millicarb type with a median cross-section of 3 μm.
Top Layer A.
99.67% by weight statistical ethylene-propylene copolymers with a $C_2$ content of 3.5% by weight
0.33% by weight $SiO_2$ as anti-blocking agent with a median cross-section of 2 μm
Top Layer B Like Top Layer A The manufacturing conditions in the individual procedural steps were:
Extrusion temperatures: 280° C.
Temperature of the outfeed roller: 30° C.
Longitudinal stretching: Temperature: 122° C.
Longitudinal stretching ratio: 6.0
Lateral stretching: Temperature: 155° C.
Lateral stretching ratio: 8.0
Fixing: Temperature: 140° C.
Convergence: 15%

In this way, an opaque film containing vacuoles was obtained with a density of 0.6 g/cm3. The film was not porous, therefore a Gurley value cannot be determined for this film.

Usage According to the Invention

The films according to the examples and comparative examples were cut into the label mould, prepared conventionally on the blow-moulding machine and, before the blow-moulding process, inserted in the mould, whereby the film according to example 1 and comparative example 1 were inserted in such a way that the microporous layer faced the box. A blow-moulding machine was equipped with a tool for a bellied bottle. The blow-moulding machine was loaded with HD-PE blow-moulding wares with an MFI of 0.4 g/10 min. The HDPE was extruded cylindrically at a temperature of around 200° C. through a tubular die. The mould was closed and thereby the lower end of the fusion tube was sealed. A lance was inserted in the upper end of the tube and the tube inflated with a pressure of 10 bar in the mould. Subsequently, the mould was pulled apart and the container removed.

The porous label films according to example 1 and comparative example 1 were joined fast to the container and all showed a spotless, smooth appearance, without any kind of sign of orange peel. The opaque films containing vacuoles according to example 1 showed, despite significantly raised Gurley values, i.e. lower permeabilities to gas, no detriment to the adhesion or appearance. Consequently, the films could be manufactured advantageously with more than double the production speed relative to comparative example 1, without problems arising in the usage according to the invention.

The invention claimed is:

1. A method for manufacturing a labelled container by means of a blow-moulding method, wherein in said method a thermoplastic polymer is extruded through a tubular die as a fusion tube into a two-part mould, wherein a film or at least one film segment is inserted, and through clasps of the two-part mould the fusion tube is squeezed at one end and at the opposite end air is introduced in such a way that the fusion tube is inflated and adapts itself to the mould in such a way that thereby a hollow body is formed and simultaneously the inserted label is applied,
wherein said label comprises a biaxially-oriented film with microporous layer comprising propylene polymers and at least one β-nucleating agent, wherein the microporosity of said biaxially-oriented film is achieved by transforming β-crystalline polypropylene by stretching said biaxially-oriented film, and wherein said microporous layer has a Gurley value of from 10000 to 300000 sec and forms an outer layer of said biaxially-oriented film, and
wherein the microporous layer of said film joins itself to the container and
said microporous layer comprises a mixture of propylene homopolymer and propylene block copolymer in a ratio of from 90:10 to 10:90% by weight.

2. The method of claim 1, wherein said microporous layer has a Gurley value of from 30000 to 150000 sec.

3. The method of claim 2, wherein the density of said biaxially-oriented film is from 0.3 to 0.85 $g/cm^3$.

4. The method of claim 1, wherein said microporous layer comprises from 0.001 to 5% by weight of β-nucleating agent relative to the weight of said microporous layer.

5. The method of claim 1, wherein said nucleating agent is a calcium salt of pimelic acid, a calcium salt of suberic acid, or a carboxamide.

6. The method of claim 1, wherein said biaxially-oriented film is manufactured according to one of the stenter methods and the outfeed roller temperature is from 60 to 130° C.

7. The method of claim 1, wherein said biaxially-oriented film consists of a single microporous layer.

8. The method of claim 1, wherein said biaxially-oriented film is multi-layered and wherein one surface of said microporous layer comprises an additional top layer.

9. The method of claim 8, wherein said additional top layer is applied by means of coextrusion, coating, or lamination.

10. A method for manufacturing a labelled container by means of a blow-moulding method, wherein in said method a thermoplastic polymer is extruded through a tubular die as a fusion tube into a two-part mould, wherein a film or at least one film segment is inserted, and through clasps of the two-part mould the fusion tube is squeezed at one end and at the opposite end air is introduced in such a way that the fusion tube is inflated and adapts itself to the mould in such a way that thereby a hollow body is formed and simultaneously the inserted label is applied,
wherein said label comprises a biaxially-oriented film with microporous layer comprising propylene polymers and at least one β-nucleating agent, wherein the microporosity of said biaxially-oriented film is achieved by transforming β-crystalline polypropylene by stretching said biaxially-oriented film, and
wherein an outer side of said microporous layer further comprises a top layer, and wherein said biaxially oriented film is prepared by biaxial stretching of an unstretched prefilm with a β-crystalline polypropylene content of 20 to 60% and
said microporous layer comprises a mixture of propylene homopolymer and a propylene block copolymer in a ratio of from 90:10 to 10:90% by weight.

11. The method of claim 1, wherein said microporous layer comprises a mixture of propylene homopolymer and propylene block copolymer in a ratio of from 70:20 to 20:70% by weight.

12. The method of claim 10, wherein said microporous layer comprises a mixture of propylene homopolymer and propylene block copolymer in a ratio of from 70:20 to 20:70% by weight.

* * * * *